United States Patent [19]
Eckert

[11] Patent Number: 5,195,771
[45] Date of Patent: Mar. 23, 1993

[54] DEVICE FOR OBTAINING AN AXLE-LOAD SIGNAL FROM A DRIVE AXLE OF A LIFTING AXLE STRUCTURE

[76] Inventor: Horst Eckert, Alte Poststrasse 15, D-3056 Rehburg-Loccum 3, Fed. Rep. of Germany

[21] Appl. No.: 780,279

[22] Filed: Oct. 18, 1991

Related U.S. Application Data

[63] Continuation of Ser. No. 540,376, Jun. 19, 1990, abandoned.

[30] Foreign Application Priority Data

Jun. 21, 1989 [DE] Fed. Rep. of Germany ....... 3920288

[51] Int. Cl.$^5$ ............................................. B60G 11/26
[52] U.S. Cl. ....................................... 280/704; 267/31
[58] Field of Search ..................... 280/704, 149.1, 678, 280/707, 711, 714, 709, 715; 180/24.02, 290, 24.01, 209; 267/241, 242, 229, 256, 64.11–64.28, 31, 32, 25; 177/136, 134; 73/862.54

[56] References Cited

U.S. PATENT DOCUMENTS

| | | | |
|---|---|---|---|
| 3,094,341 | 6/1963 | Alfieri | 267/31 X |
| 3,390,895 | 7/1968 | Verdi | 267/31 X |
| 3,499,663 | 3/1970 | Hedlund et al. | 280/704 |
| 3,870,336 | 3/1975 | Bilas | 280/704 |
| 3,871,491 | 3/1975 | Yamanaka et al. | 177/134 X |
| 4,089,544 | 5/1978 | Raidel | 267/31 X |
| 4,505,344 | 3/1985 | Hobbs et al. | 177/136 |
| 4,573,704 | 3/1986 | Van Den berg et al. | 280/704 |
| 4,673,047 | 6/1987 | Harbour | 177/136 |
| 4,700,968 | 10/1987 | Cherry | 280/704 |
| 4,705,133 | 11/1987 | Christenson et al. | 280/704 X |
| 4,789,038 | 12/1988 | Nguyen et al. | 180/24.02 |
| 4,842,302 | 6/1989 | Lauronen et al. | 180/24.02 X |
| 4,854,409 | 8/1989 | Hillebrand et al. | 180/24.02 |
| 4,944,526 | 7/1990 | Eberling | 280/704 |
| 4,993,729 | 2/1991 | Payne | 280/704 X |
| 5,025,877 | 6/1991 | Assh | 280/704 X |
| 5,058,916 | 10/1991 | Hicks | 280/704 |
| 5,090,495 | 2/1992 | Christenson | 280/704 X |

Primary Examiner—Douglas C. Butler

[57] ABSTRACT

The axial load of the mechanically spring-supported drive axle of a lifting axle structure aggregate is defined by a compression of a respective suspension spring and the pressure of the lifting bellows. A two-dimensional contour is disposed at a signal body which determines for each disposition of the rotary angle the position of a first end piece of a tappet, which position of the end piece of the tappet represents a value corresponding to the axial load signal to be obtained. The two-dimensional contour is employed to engage the tappet and deliver a distanace signal. The tappet is shiftable in a direction disposed parallel to its axis based on the contour curve of the cam. The tappet is also shiftable based on the spring support. The setting of the position of the a second end piece (26) of the tappet (22, 24, 26) is superposed to a setting of the position depending on the tappet length by the contour (20, 21).

10 Claims, 5 Drawing Sheets

DEVICE FOR OBTAINING AN AXLE-LOAD SIGNAL FROM A DRIVE AXLE OF A LIFTING AXLE STRUCTURE

This is a continuation of application Ser. No. 07/540,376, filed Jun. 19, 1990, now abandoned.

BACKGROUND OF THE INVENTION

1. Field of the Invention

The invention relates to a device for obtaining an axle-load signal from the mechanically spring-supported drive axle of a lifting axle structure aggregate, comprising the drive axle and a lifting axle, where the lifting axle can be disconnected by applying pressure to at least one pressure means element employing at least one disengagement pressure.

2. Brief Description of the Background of the Invention Including Prior Art

Conventionally, a lifting axle is lifted from the road surface based on pressure application to a pressure means element with a disengagement pressure or a higher pressure and is thereby disengaged in a lifting axle structure aggregate. In this state, the drive axle operates as a single axle and carries the full axle load. Upon pressure release of the pressure means element, which can occur either by action of the vehicle driver, or automatically, the lifting axle can be lowered toward the road surface and thus can be activated and engaged, and the lifting axle structure aggregate can be used as a double axle while its load capability is increased.

The height level of the disengagement pressure depends, amongst other variables, on the momentary axle load of the lifting axle structure aggregate and on the construction lay-out and dimensions of the pressure means element. When a lower pressure than the disengagement pressure is exerted onto the pressure means element, the lifting axle accepts, depending on the level of the pressure, a part of the momentary axle load. If only an ambient pressure prevails in the pressure means element, i.e. the the pressure is completely released in the pressure means element, then the axle-load part, accepted by the lifting axle, is determined only according to the lever relationships in the lifting axle structure aggregate. In this state, the lifting axle is fully engaged.

The axle load or, respectively, the axle-load part of the drive axle, upon disengaged or upon engaged lifting axle, respectively, can be described by the path of a defined point of the drive axle relative to the vehicle chassis and by the pressure of the pressure means element. In case of a fully engaged lifting axle, i.e. where ambient pressure prevails in the pressure means element, the axle-load part of the drive axle is proportional to the axle load of the complete lifting axle structure aggregate and thus also represents a measure for the axial load of the complete lifting axle structure aggregate. In case of engagement and disengagement of the lifting axle, i.e. during the lowering and raising of the lifting axle, the defined point of the drive axle performs a jump along a path representing its position points, which jump cannot be employed and evaluated for determining the axle load.

A device of the kind initially recited is described in the German Patent Application P 3,840,838.4. A three-dimensional characterizing field is disposed on the surface of the signal body, as described in the German Patent Application P 3,840,838.4. This characterizing field exhibits for each configuration of rotary position and axial position of the signal body a predetermined distance from one point of the vehicle chassis. This distance is captured and observed by the tappet guided axially shiftable at the chassis and the distance is transformed by way of the tappet into the axle-load signal to be obtained. Depending on the path of the defined point of the drive axle relative to the vehicle chassis, based on a spring compression of the drive axle, the signal body is rotated around a rotation axis fixed relative to the vehicle chassis and is axially shifted depending on the pressure of the pressure means element in order to obtain a load-dependent setting of the signal body and thus of the characterizing field.

This conventional structure is expensive based on the required three-dimensional characterizing field on the surface of the signal body.

SUMMARY OF THE INVENTION

1. Purposes of the Invention

It is an object of the present invention to provide a device for obtaining an axle-load signal which can be constructed at low cost.

These and other objects and advantages of the present invention will become evident from the description which follows.

2. Brief Description of the Invention

The present invention provides for an apparatus for obtaining an axle-load signal and comprises a lifting axle structure aggregate for a vehicle chassis. A mechanically spring-supported drive axle is disposed in the lifting axle structure aggregate. A lifting axle supported by at least one pressure means element is disposed in the lifting axle structure aggregate. The lifting axle is constructed disengageable by pressure application to the pressure-means element. A rotatable signal body is attached to the lifting axle structure aggregate. Said rotatable signal body is rotatable around a rotation axis. The rotation angle position of the rotatable signal body depends on the path of a first point fixed relative to a height level of the drive axle and a second point fixed at the vehicle chassis. A jacket face of the signal body has at least one contour. Said contour assumes a predetermined radius in a defined direction relative to the vehicle for each rotation angle position of the signal body. A tappet has a first contour end for contacting the contour of the signal body and captures the variable distance between the first point and the second point. Said tappet is shiftably guided in tappet axial direction. A cylinder unit is disposed in the tappet and is fed by the pressure of the pressure-means element disposed in the tappet.

The pressure means element can be formed by lifting bellows and can be furnished with at least one disengagement pressure. The rotatable signal body can be rotatable around a rotation axis fixedly disposed at the vehicle chassis. The tappet can be shiftable in tappet axial direction and in a defined direction relative to the vehicle chassis disposed substantially perpendicular to the rotation axis of the signal body toward a point fixed relative to the vehicle chassis. The tappet can capture the variable distance between the first point and the second point and can transduce said variable distance into a defined shift in tappet axial direction at the vehicle chassis.

A stator can be disposed in a defined fixed position relative to the signal body axis. The tappet can be formed as an armature of the stator for furnishing an electrical displacement sensor.

Alternatively, the tappet can be formed as a regulating member of the automatic level control valve or as a regulating member of the automatic load-sensing valve.

The tappet can form a cylinder unit connected to a pressure feed line. A throttle can be disposed in the pressure feed line connected to the cylinder unit.

An apparatus for obtaining an axle-load signal comprises a linkage having a first end and a second end for transforming a linear displacement at the first end into a rotation angle displacement around a point of the second end. A signal body is rotatable around a rotation axis and is attached to the second end of the linkage. A contour is disposed at the signal body periphery for furnishing a cam structure and for defining in a certain fixed radial direction from the rotation axis a distance differential relative to the displacement at the first end of the linkage. A variable-length tappet has a first end and a second end and incorporates a cylinder defining a cylinder volume filled with a pressure means and is furnished with a piston. The piston is associated with both of the tappet ends. The tappet is slidable along the fixed radial direction. The first end of the tappet is contacting the contour of the signal body. The second end of the tappet furnishes a means for sensing purposes. A connection path connects a pressure means element to the cylinder volume filled with the pressure means.

A piston spring can press against the back side of the piston opposite to the cylinder volume. The piston spring can be supported at a face of the cylinder to be disposed substantially parallel to the face of the piston facing the cylinder volume and facing the same direction as said face of the piston.

A casing can surround the tappet such that the tappet can slide in the casing. A casing spring can be supported at the casing and engage the tappet for pressing the first end of the tappet against the contour.

The connection path can be furnished by a flexible conduit having a first end connecting the cylinder volume through a cylinder wall and having a second end connected to a feed through passing through a casing wall.

A stator can be disposed in a defined fixed position relative to the signal body axis. The tappet can be formed as an armature of the stator for furnishing an electrical displacement sensor.

The connection path can be furnished by a tube formed along the axis of the tappet inside of the second end of the tappet. The second end of the tappet can plunge into the stator. Sealing means can be disposed between an inner cylinder wall of the stator and the outer wall of the second end of the tappet. A connection conduit can sealingly connect a side of the inner cylinder wall of the stator opposite to the side of the plunging second end of the tappet to the pressure means element.

The pressure means element can be formed by lifting bellows and can furnish at least one disengagement pressure. The rotatable signal body can be rotatable around a rotation axis fixedly disposed at the vehicle chassis. The tappet can be shiftable in tappet axial direction and in a defined direction relative to the vehicle chassis disposed substantially perpendicular to the rotation axis of the signal body toward a point fixed relative to the vehicle chassis. The tappet can capture the variable distance between a first point and a second point and can transduce said variable distance into a defined shift in tappet axial direction at the vehicle chassis.

Alternatively, the second end of the tappet can be formed as a regulating member of the automatic level control valve or of the automatic load-sensing valve.

The pressure means element can be formed by bellows. A throttle can be disposed in the connection path between the cylinder volume and the bellows.

The length of the tappet is increased depending on the pressure of the pressure-means element by the cylinder unit such that the axle-load signal results from the respective distance of the contour from the defined point of the vehicle chassis and of the respective length of the tappet.

The invention can be performed in connection with all suitable pressure fluids.

The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

The same reference numerals are employed in the drawings for construction elements performing the same function and illustrated in different figures.

DESCRIPTION OF INVENTION AND PREFERRED EMBODIMENT

Figure 1:
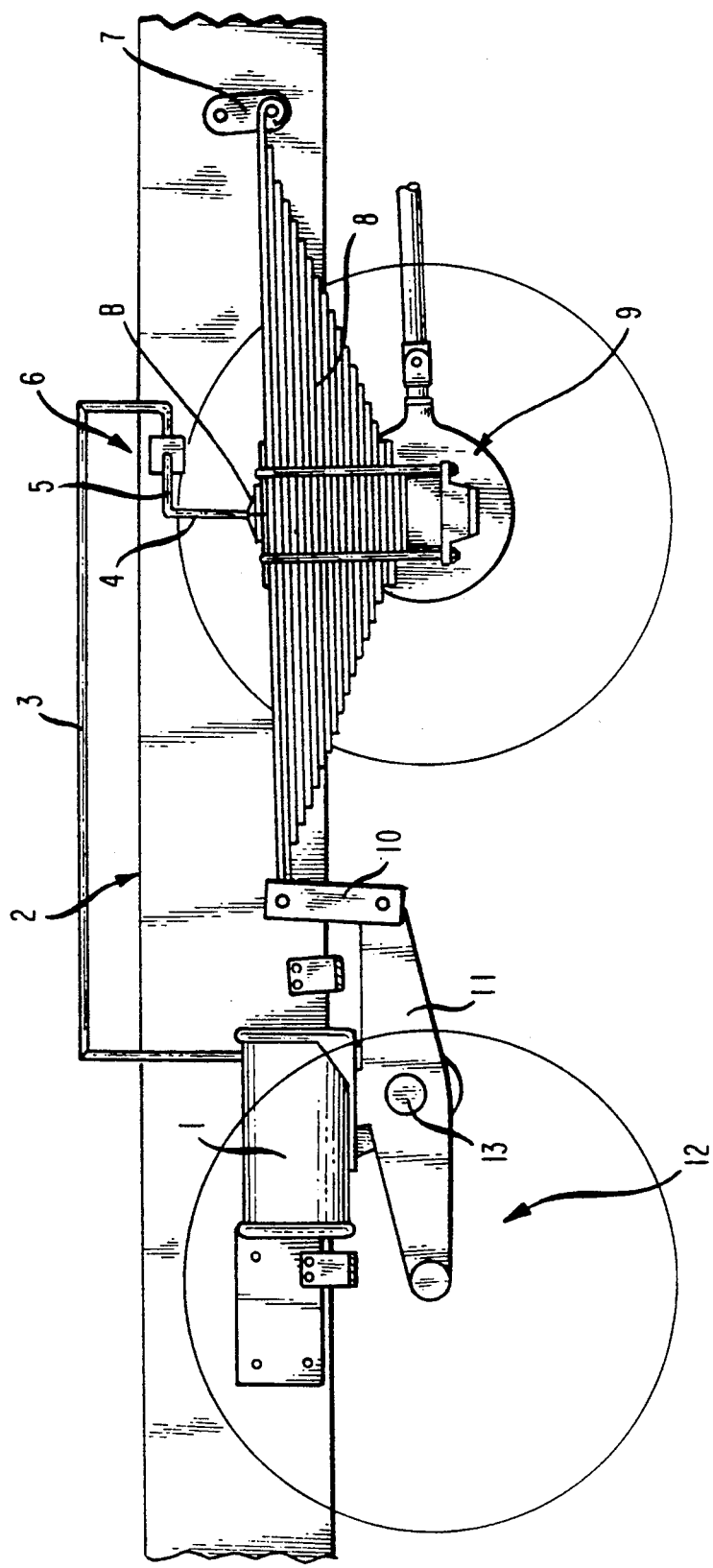
FIG. 1 is a schematic side elevational view of a general arrangement of a lifting axle structure aggregate with a device for obtaining an axle-load signal from the drive axle of the lifting axle structure aggregate.

The tappet 22, 24, 26; 22, 24, 40 can be formed as an armature of an electrical displacement sensor 28. The tappet 22, 24, 50 can be formed as a regulating member of an automatic level control valve 52. The tappet 22, 24, 62 can be formed as a regulating member of an automatic load-sensing valve 60, 62.

A throttle 30 can be disposed in the feed line 3 of the pressure to the cylinder unit 24.

FIG. 1 shows partially a vehicle chassis, generally designated with the reference numeral 2, which comprises in a conventional way a vehicle frame as well as body parts and mounting parts. A lifting axle structure aggregate 12 is suspended at the vehicle chassis 2 via at least a mechanical spring element, suspension and connection means 7, 10, 13, at least a double lever 11, and at least a pressure means element. The mechanical spring element is formed as a leaf spring 8 and is referred to under such designation in the following. The pressure-means element is formed as a lifting bellows 1 and is referred to as such in the following. The lifting bellows is usually employed where the pressure means is gaseous and, in particular, is represented by air. However, it is similarly conventional to employ piston cylinders as pressure means element and this is done, in particular, in case of employment of a hydraulic pressure means. In addition, other construction features can form a mechanical spring element.

The lifting axle structure aggregate comprises a drive axle 9, mechanically spring-supported by the leaf spring 8, and a lifting axle 12. The lifting axle 12 is represented as a trailing lifting axle or as a dolly lifting axle or as a lifting dummy axle, but can also be disposed in a conventional way as a leading lifting axle.

The mode of operation of such a lifting axle structure aggregate is illustrated in detail in the section "Background of the Invention." For purposes of completion, it is added that the lever relations, recited in the above section "Background of the Invention," result from the lever lengths of the double lever 11 and of the length of the leaf spring 8.

FIG. 1 illustrates in addition the general arrangement of a device 6 for obtaining an axle-load signal from the drive axle 9. The path of a point B of the drive axle 9 about in the direction of the axle load, i.e. about perpendicular to the road surface, and relative to the vehicle chassis 2, i.e. the spring compression of the drive axle 9, is transferred to the drive axle 9 via a linkage 4 and a lever 5. For purposes of simplicity and clarity, the point B is illustrated at a region of the leaf spring 8, which region is solidly and rigidly connected to the drive axle 9. The point B can however alternatively also be provided at different suitable regions of the drive axle 9 or of the leaf spring 8.

In addition, the pressure prevailing in the lifting bellows 1 is fed to the device 6 via a pressure means conduit line 3.

Figure 2:
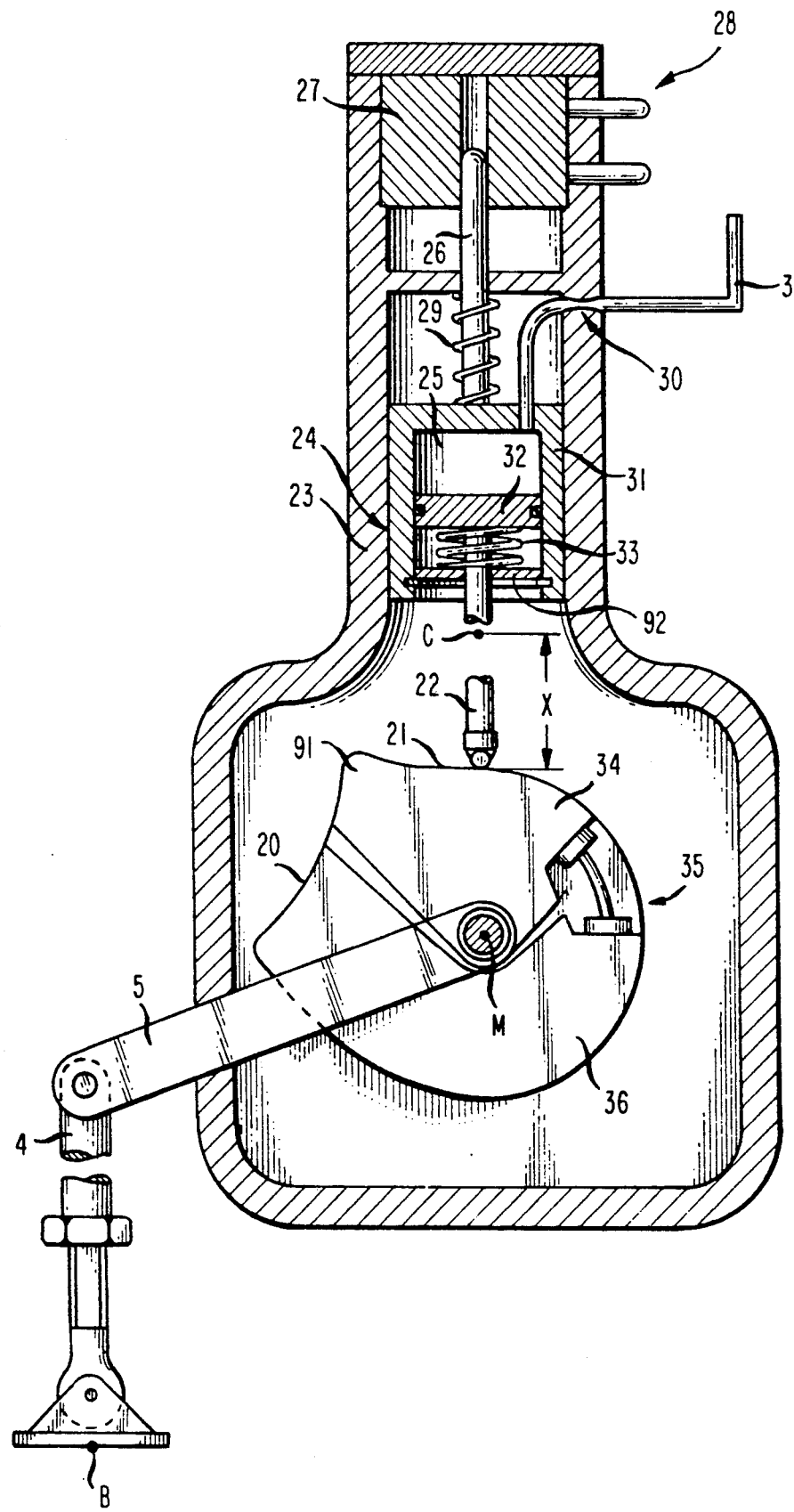
FIG. 2 is a partially sectional view of the structure for obtaining the axle-load signal.

FIG. 2 illustrates details of the device 6. A signal body 34, 36 is rotatably supported around a rotation axis in a casing 23. The rotation axis is referred to in the following with the reference mark M of its intersection point with the plane of the drawing. The casing 23 is attached at the vehicle frame such that the casing 23 itself forms a component of the vehicle chassis 2. A point C is defined in the casing 23 and thus at the vehicle chassis 2. The point C can be disposed arbitrarily within the limits set by its functions described further below. For example, the point C can be disposed on the rotation axis M.

The jacket face of the signal body 34, 36 exhibits a contour 20, 21, representing a cam, which contour 20, 21 is disposed, for each rotation position of the signal body 34, 36, at a predetermined distance x substantially perpendicular to the rotation axis M from the point C, where the point C defines the location of a sensing pin 22 contacting the contour for sensing the angular position of the signal body based on the cam radius corresponding to such position. The contour 20, 21 can be formed as a planar face or as a linear section at the signal body 34, 36. The contour 20, 21 is preferably formed as a cam structure.

The lever 5 engages at the signal body 34, 36. The lever 5 is connected to the linkage 4 at the free end of the lever 5. In this way, the path under consideration of the point B of the drive axle 9 is transformed into a rotation angle of the signal body 34, 36 around the axis M.

The contour 20, 21 comprises two sections 20 and 21, respectively. The contour section 21 determines the distance x in case of a disengaged lifting axle 12, and the second contour section 20 determines the distance x in case of an engaged lifting axle 12 with wheels rolling on the road surface. In case of an engaged lifting axle, according to FIG. 2, the distance x is substantially variable with the angle of the signal body 34, 36. Between these two sections, the contour 20, 21 comprises a neutral region 91, which corresponds to the path jump between two positions corresponding to engagement and disengagement of the lifting axle 12 and its wheel with a road surface. The course of the contour 20, 21 is determined in the contour section 21 by the spring characteristic of the leaf spring 8 and in the section 20 by the spring characteristic of the combination of the leaf spring 8 and of the lifting bellows 1.

A tappet 22, 24, 26 is guided axially shiftable in the casing 23 having a hollow cylindrical section and thus at the vehicle chassis 2. The position of the tappet 22, 24, 26 captures and represents the distance x relative to the point C fixed to the chassis.

The tappet 22, 24, 26 comprises contact end piece 22 and armature end piece 26 and a cylinder unit 24 disposed between the contact end piece 22 and the armature end piece 26. The cylinder unit 24 is fed via the pressure means conduit line 3 with the pressure of the lifting bellows 1 and sets the length of the tappet depending on this pressure. Therefore, depending on the height level of the pressure of the lifting bellows 1, an axial shifting along the tappet axis of the contact end piece 22 can initiate different axial shiftings of the armature end piece 26.

The contact end piece 22 of the tappet 22, 24, 26 is pretensioned against the signal body 34, 36, for example, by way of a casing spring 29.

The mode of operation of the invention structure is as follows.

Each path of the point B of kind under consideration is transferred to the signal body 34, 36 via the linkage 4 and the lever 5, and each path of the point B rotates the signal body 34, 36 correspondingly. In this case, the contact end piece 22 of the tappet 22, 24, 26 follows the contour 20, 21 and is shifted correspondingly, thereby capturing the distance x. The armature end piece 26 of the tappet in this case covers a shifting path resulting from the shifting of the contact end piece 22 contacting the contour and from a change of the tappet length. The resulting shifting of the armature end piece 26 characterizes, depending on the state of operation of the lifting axle 12, the axle load or the axle-load part, respectively, of the drive axle 9 and thus provides the axle-load signal to be obtained. As noted above, this corresponds also to the axle load of the complete lifting axle structure aggregate in case of a fully engaged lifting axle. Several constructive details of the illustrated structure are described in the following.

The recited pretensioning of the tappet 22, 24, 26 versus the signal body 34, 36 is performed via a spring 29, supported, on the one hand, at a suitable part of the tappet 22, 24, 26 and, on the other hand, at the casing 23. However, the recited pretensioning of the tappet 22, 24, 26, can be performed with any other suitable means.

The cylinder unit 24 of the tappet comprises a cylinder 31 and a piston 32. A chamber 25, connected to the pressure-means conduit line 3, is enclosed between the cylinder 31 and the piston 32. The piston 32 is pretensioned by a piston spring 33, supported, on the one hand, at the piston 32 and, on the other hand, at the cylinder 31, against the pressure prevailing in the chamber 25. The piston 32 is connected to the contact end piece 22. The cylinder 31 is connected to the armature end piece 26.

As long as ambient pressure prevails in the lifting bellows 1 and thus in the chamber 25, the piston spring 33 shifts the piston 32 in the direction of smallest volume of the chamber 25 and thus allows and sets a smallest tappet length. The piston spring 33 is increasingly compressed with increasing pressure in the lifting bellows 1 and thus the volume in the chamber 25 increases simultaneously. The piston spring 33 thereby allows a pressure-dependent shifting of the piston 32 in the cylinder 31 in the direction of the enlarging volume of the chamber 25, thus resulting in a corresponding extension of the cylinder unit 24 and an increase of the tappet length.

The piston spring 33 is formed such or can be adjusted such that, upon disengagement pressure in the lifting bellows 1 and thus in the chamber 25, the piston 32 assumes in the cylinder 31 exactly the position of the largest volume of the chamber 25 and thus the tappet 22, 24, 26 assumes exactly the largest tappet length. A surpassing of the recited largest tappet length, in case of an increase of the pressure in the lifting bellows 1 and in the chamber 25 above the disengagement pressure, is prevented by a stopping of the piston 32 at a stop at the cylinder 31 or by the blocking of the piston spring 33, in a way not illustrated in detail, or by a cylinder end wall 92 supporting one end of the piston spring 33.

A further embodiment of the invention structure exhibits in the pressure-means conduit line 3 a throttle 30. This throttle 30 prevents that each pressure peak in the lifting bellows 1, caused by the road surface, passes into the chamber 25 and thus changes the tappet length as well as generates an axle-load signal.

A different embodiment comprises that the signal body 34, 36 is made up, in a way not illustrated, of two parts 34 and 36 with each having a contour section 21 or 20, respectively, of the contour 20, 21. The position of contour sections 20, 21 to each other can be adjusted by a schematically indicated adjustment device 35 for balancing assembly tolerances of the product structure and the tolerances of the spring characteristics of the leaf spring 8 and of the lifting bellows 1. The signal body 34, 36 can be constructed as a single part in a way not described here in detail under renunciation of this possibility.

The axle-load signal, generated by the sensing device 6 and present by way of the resultant shifting of the armature end piece 26, can be evaluated in any suitable manner. In the present embodiment, the tappet 22, 24, 26 is formed for this purpose as comprising an electrical armature of a stator for performing as a way-path or displacement position sensor, generally designated with the reference numeral 28. The displacement sensor 28 includes a schematically indicated stator 27 for the armature end piece 26 constructed in a conventional way. The armature end piece 26 of the tappet 22, 24, 26 immerses into the stator 27 with a varying plunging depth, depending on the resulting shifting. The displacement sensor 28 delivers thereupon a corresponding electrical axle-load signal. This embodiment can therefore be used and applied in an advantageous way in connection with special control and/or automatic control purposes of a lifting axle structure aggregate. For example, consideration can be given in this connection to an automatic load-controlled brake force control, traction control, initial drive start aid, drive-axle overload protection, and the like.

In this context, the term "drive-axle overload protection" means that the lifting axle 12 is automatically put into an engagement position by way of a suitable control device, if the drive axle 9 is loaded up to the maximum permissible value. In case of a "traction control," the pressure in the lifting bellows 1 is controlled via a suitable control device such that the once reached permissible axle load of the drive axle 9 is automatically limited and controlled. This ensures that the highest the drive axle 9 onto the road surface. The "initial drive start aid" refers to a short-term control of the pressure in the lifting bellows 1 by a suitable control device such that the drive axle 9 is also overloaded for a short time. The advance drive force, transferrable from the drive axle 9 onto the road surface, is thereby increased for a short time. This is an advantage in particular during the initial drive start on a road surface with a low frictional engagement, such as soft-surface or muddy roads.

The just described coordination of the parts of the cylinder unit 24 to the contact piece 22 and the armature end piece 26 of the tappet 22, 24, 26 can also be reversed in a manner not illustrated here in detail. Presupposing a corresponding structure of the displacement sensor 28, the cylinder unit can also be formed such that it effects a pressure-dependent shortening of the length of the tappet.

Figure 3:
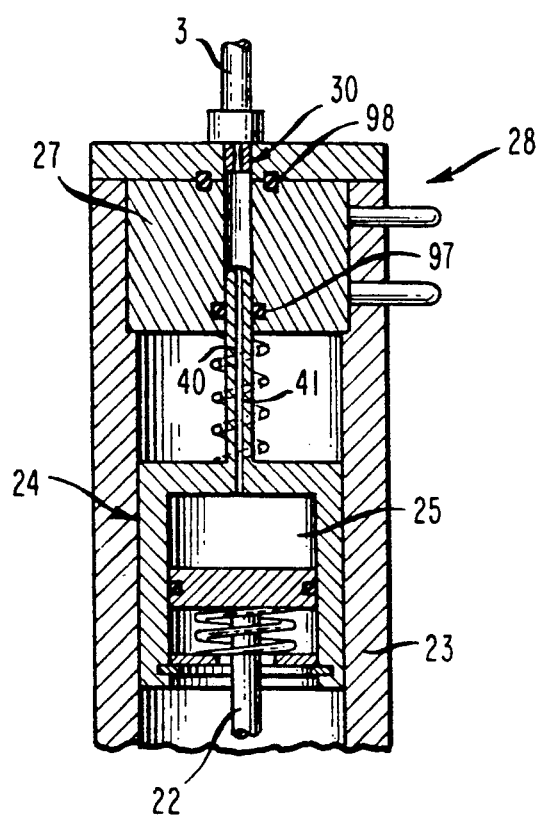
FIG. 3 is a sectional view of a particular embodiment related to the embodiment of FIG. 2.

FIG. 3 shows in detail a further embodiment of embodiment of FIG. 2. This further embodiment is distinguished from that of FIG. 2 by way of the following details. An armature end piece 40 immersing into the stator 27 of the tappet, designated here with reference numerals 22, 24, 40, is sealingly guided in the stator 27 incorporating seals 97, 98. The pressure means conduit line 3 of the lifting bellows 1 joins into the inner space of the stator 27, not specifically designated. A connection channel 41 is provided for connection of this inner space, not specifically designated, to the chamber 25 in the armature end piece 40.

Figure 4:
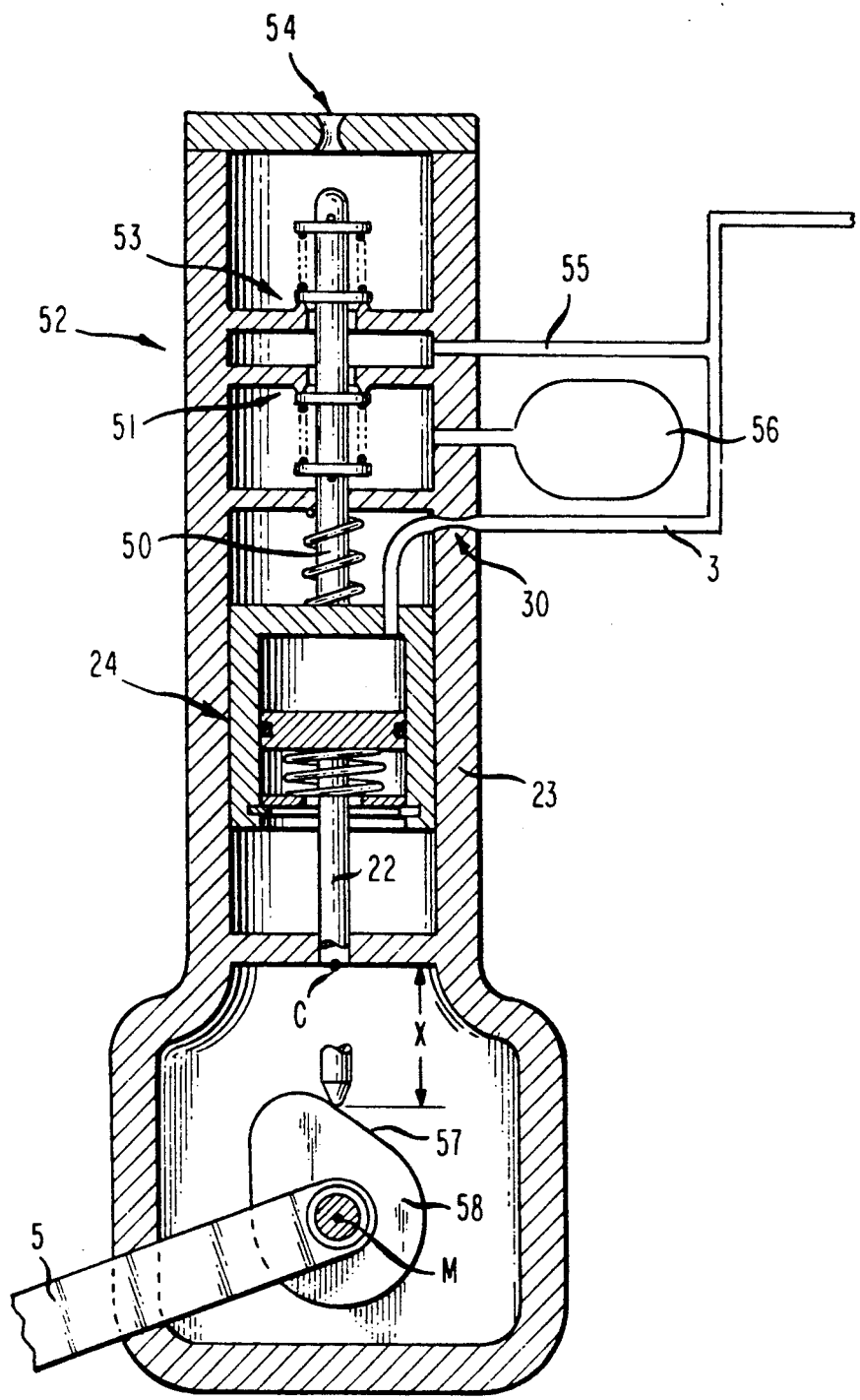
FIG. 4 is an in part sectional view of another embodiment of a device for obtaining an axle-load signal.

With the exception of the kind of the evaluation of the axle-load signal, the embodiment according to FIG. 4 corresponds to the embodiment according to FIG. 2.

Instead of the electrical displacement sensor 28 (FIG. 3), this exemplified embodiment exhibits an automatic level control valve, designated with reference numeral 52. At the pressure output of the automatic level control valve, the pressure-means conduit line 3 is connected via a connection line 55. The tappet, designated now with reference numerals 22, 24, 50, is formed as a regulating member of the automatic level control valve 52, which can be an automatic load-levelling valve or a ride-control valve. This means that the resulting displacement of the second end piece, designated here with reference numeral 50, of the tappet 22, 24, 50, forming the axle-load signal, is employed directly for controlling the input valve 51 and the output valve 53 of the automatic level control valve 52. Depending on a resulting displacement shift of the second end piece 50, i.e. depending on the axle-load signal, the lifting bellows 1 are connected in a conventional way via an input valve 51 to a pressure-means supply 56 or via an output valve 53 to a pressure-release connection 54. The set point distance of the point B at the drive axle 9, substantially in the direction of the axial load relative to an arbitrary point of the vehicle chassis 2 and thus the axial load of the drive axle 9, is automatically controlled in a conventional way. This embodiment represents thus a simple structure for a control of traction.

The contour, designated here with 57, of the signal body, designated with the reference numeral 58, does not have to take into consideration the spring characteristics of the leaf spring 8 and of the lifting bellows 1 as well as the already mentioned jump path of the drive axle 9 in case of an engagement and a disengagement of the lifting axle 12. The contour 57 can therefore be limited to defining a linear connection between the recited path of the point B and the distance x, wherein the linear connection can represent a multiplication of division factor.

Figure 5:
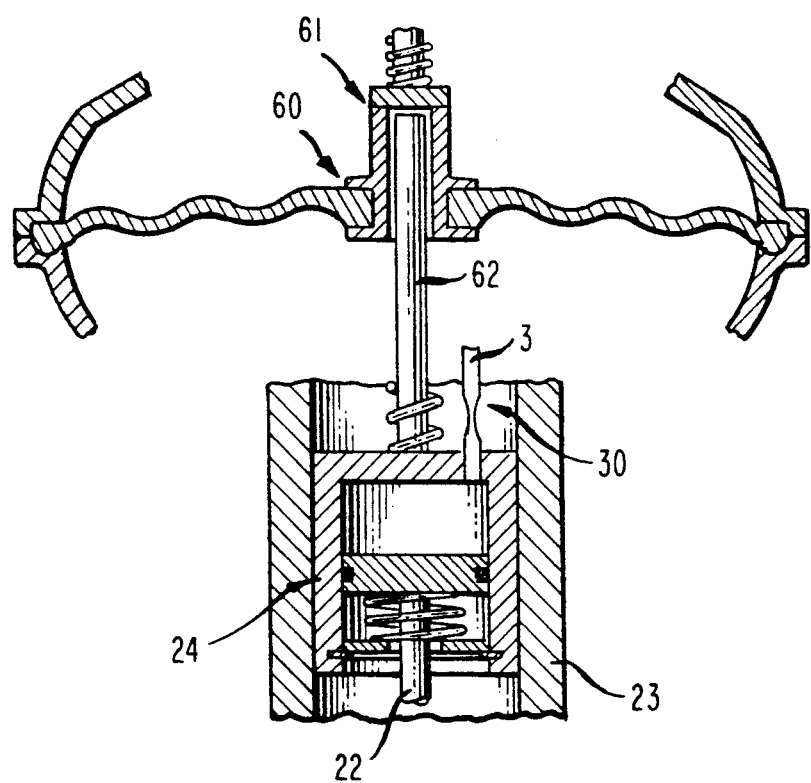
FIG. 5 is an in part sectional view of a further embodiment of a device for obtaining an axle-load signal.

The tappet, designated with reference numerals 22, 24, 62 according to the embodiment of FIG. 5, is formed as a regulating member of an automatic load-sensing valve. The automatic load-sensing valve is constructed based on a tappet-controlled construction and is indicated schematically by its automatic control valve 61 and its automatic control piston unit 60. The axle-load signal, delivered by the second end piece 62 of this embodiment, is employed based on its resulting shifting directly for actuating the automatic control valve 61 of the automatic load-sensing valve.

Unless there is a different indication in the preceding statements, the illustrations given for one embodiment hold also for the other embodiments in a corresponding fashion. It is obvious that also several devices for obtaining an axle-load signal and/or for its evaluation, in particular of the precedingly recited kind, can be furnished simultaneously, for example, in parallel or staggered, according to an angle with separating casings or with joint casings.

A person of ordinary skill in the art will also recognize that the invention elements, disposed in the exemplified embodiments in or, respectively, at the casing 23, can also be disposed without a joint casing as long as they meet the conditions essential for the invention, for example, the elements of the vehicle chassis, or respectively, the drive axle or, respectively, the lifting axle structure aggregate.

It will be understood that each of the elements described above, or two or more together, may also find a useful application in other types of devices for obtaining a signal differing from the types described above.

While the invention has been illustrated and described as embodied in the context of a device for obtaining an axle-load signal of a drive axle of a lifting axle structure aggregate, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An apparatus for obtaining an axle-load signal derived from a mechanically spring-supported drive axle of a lifting axle structure aggregate comprising said drive axle and a lifting axle supported by at least one pressure-means element, said lifting axle being disengageable by application of a pressure of at least a level of a disengagement pressure to said at least one pressure means element, comprising
(a) a signal body which is rotatable, depending on a path of a first point of the drive axle relative to a vehicle chassis, around a rotation axis fixedly disposed at the vehicle chassis;
(b) a jacket face of the signal body exhibits at least one contour, which assumes for each rotation angle position of the signal body a predetermined distance from a second point of the vehicle chassis, said perdetermined distance being substantially disposed perpendicular to the rotation axis;
(c) a tappet, capturing the predetermined distance and wherein said tappet is shiftably guided in tappet axial direction on the vehicle chassis, wherein a cylinder unit, fed by the pressure of the pressure-means element, is disposed in the tappet.

2. The apparatus according to claim 1, wherein the tappet is formed as an armature of an electrical displacement sensor.

3. The apparatus according to claim 1, wherein the tappet is formed as a regulating member of an automatic level control valve.

4. The apparatus according to claim 1, wherein the tappet is formed as a regulating member of an automatic load-sensing valve.

5. The apparatus according to claim 1, wherein a throttle is disposed in the feed line of the pressure to the cylinder unit.

6. In a vehicle having a vehicle chassis and a lifting axle structure
said lifting axle structure comprising a drive axle and a lifting axle,
said drive axle being mechanically spring-supported by said vehicle chassis and said lifting axle being supported by said vehicle chassis via at least one pressure-means element;
said lifting axle being disengageable by application of a pressure of at least a level of a disengagement pressure to said at least one pressure-means element
an apparatus for obtaining an axle-load signal derived from said drive axle, comprising
(a) a signal body which is rotatable, depending on a path of a point of the drive axle relative to said vehicle chassis, around a rotation axis fixed at said vehicle chassis;
(b) said signal body having a jacket face which exhibits at least one contour, which assumes for each rotation angle position of the signal body a predetermined distance from a point of said vehicle chassis, said distance being substantially disposed perpendicular to said rotation axis;
(c) a tappet capturing said distance, said tappet being shiftably guided in tappet axial direction on the vehicle chassis; and
(d) a cylinder unit disposed in said tappet, said cylinder unit being fed by the pressure in said pressure-means element.

7. The apparatus according to claim 6, wherein said tappet is formed as an armature of an electrically displacement sensor.

8. The apparatus according to claim 6, wherein the tappet is formed as a regulating member of an automatic level control valve.

9. The apparatus according to claim 6, wherein the tappet is formed as a regulating member of an automatic load-sensing valve.

10. The apparatus according to claim 6, wherein a throttle is disposed in the feed line of the pressure to the cylinder unit.

* * * * *